(12) United States Patent
Piggush et al.

(10) Patent No.: US 8,348,614 B2
(45) Date of Patent: Jan. 8, 2013

(54) COOLABLE AIRFOIL TRAILING EDGE PASSAGE

(75) Inventors: Justin Piggush, Hartford, CT (US); William Abdel-Messeh, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1137 days.

(21) Appl. No.: 12/172,997

(22) Filed: Jul. 14, 2008

(65) Prior Publication Data
US 2010/0008761 A1 Jan. 14, 2010

(51) Int. Cl.
*F01D 5/08* (2006.01)

(52) U.S. Cl. .................... 416/97 R; 416/96 R

(58) Field of Classification Search ............... 416/96 R, 416/97 R; 415/115
See application file for complete search history.

(56) References Cited

U.S. PATENT DOCUMENTS

| | | | |
|---|---|---|---|
| 4,684,322 A * | 8/1987 | Clifford et al. ............... 416/95 |
| 5,464,322 A | 11/1995 | Cunha et al. | |
| 5,704,763 A * | 1/1998 | Lee ............................... 416/96 R |
| 5,842,829 A | 12/1998 | Cunha et al. | |
| 6,056,505 A | 5/2000 | Cunha et al. | |
| 6,176,677 B1 | 1/2001 | Chevrefils et al. | |
| 6,183,194 B1 | 2/2001 | Cunha et al. | |
| 6,890,154 B2 | 5/2005 | Cunha | |
| 6,932,571 B2 | 8/2005 | Cunha et al. | |
| 6,955,522 B2 | 10/2005 | Cunha et al. | |
| 7,014,424 B2 | 3/2006 | Cunha et al. | |
| 7,097,424 B2 | 8/2006 | Cunha et al. | |
| 7,097,425 B2 | 8/2006 | Cunha et al. | |
| 7,131,818 B2 | 11/2006 | Cunha et al. | |
| 7,217,094 B2 | 5/2007 | Cunha et al. | |
| 7,220,103 B2 | 5/2007 | Cunha et al. | |
| 7,255,536 B2 | 8/2007 | Cunha et al. | |
| 7,303,375 B2 | 12/2007 | Cunha et al. | |
| 7,306,436 B2 | 12/2007 | Girgis et al. | |
| 7,311,497 B2 | 12/2007 | Sharma et al. | |
| 7,311,498 B2 | 12/2007 | Cunha et al. | |
| 7,351,038 B2 | 4/2008 | Girgis et al. | |
| 7,354,249 B2 | 4/2008 | Girgis et al. | |
| 7,357,623 B2 | 4/2008 | Leghzaouni et al. | |
| 7,670,112 B2 * | 3/2010 | Boury et al. ................. 416/97 R |
| 7,690,892 B1 * | 4/2010 | Liang .................................. 416/1 |
| 7,695,246 B2 * | 4/2010 | Cunha et al. ................. 416/97 R |
| 7,713,027 B2 * | 5/2010 | Cherolis et al. ............. 416/97 R |

OTHER PUBLICATIONS

Merriam Webster (Tenth Edition, 1998 by Merriam-Webster, Incorporated; p. 1277).*

* cited by examiner

*Primary Examiner* — Wael Fahmy
*Assistant Examiner* — Ali Naraghi
(74) *Attorney, Agent, or Firm* — Carlson, Gaskey & Olds PC

(57) ABSTRACT

An airfoil suitable for use in a gas turbine engine having at least one feed passage at least in part defined along a feed axis which is at least perpendicular to a cavity axis to reduce dirt ingestion into a trailing edge passage.

21 Claims, 5 Drawing Sheets

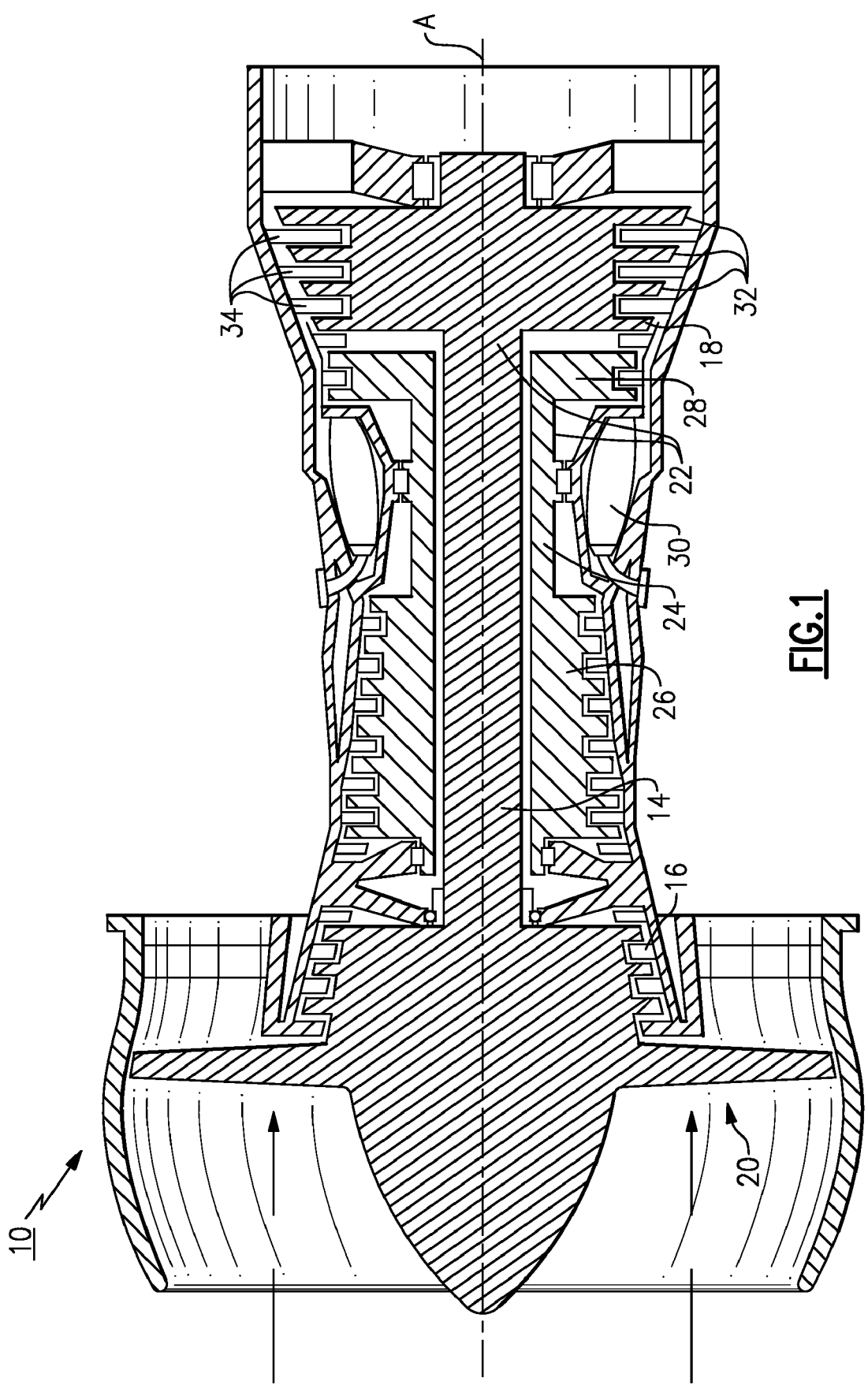

COOLABLE AIRFOIL TRAILING EDGE PASSAGE

BACKGROUND

The present invention relates to coolable airfoils of the type used in high temperature rotary machines such as gas turbine engines.

Efficiency is a primary concern in the design of any gas turbine engine. One principle technique to increase engine efficiency is elevation of core gas path temperatures. Internally cooled components manufactured from high temperature capacity alloys accommodate these elevated temperatures. Turbine stator vanes and blades, for example, are typically cooled using compressor air worked to a higher pressure, but still at a lower temperature than that of the engine core gas path.

Airfoil cooling may be accomplished by, for example, external film cooling, internal air impingement and forced convection either separately or in combination. In forced convection cooling, compressor bleed air flows through internal cavities of the blades and vanes to continuously remove thermal energy. Compressor bleed air enters the cavities through one or more inlets to the internal cavities which then discharge though various exits.

Trailing edge passages direct compressor bleed air around a pedestal array to axially exit through a trailing edge passage of the blade. Recent advances in casting, such as refractory metal core (RMC) technology, facilitates significantly smaller and more complex passages to accommodate the elevated temperatures with a reduced flow of compressor bleed air.

These trailing edge passages may be susceptible to being plugged by dirt and debris such that a minimum passage height must be observed. The passage area determines the cooling flow exit Mach number. As the cooling fluid exits into the engine core gas path, this exit Mach number may be less than optimum from an aerodynamic loss standpoint. To reduce this aerodynamic loss, the passage height restrictions must be circumvented, but to reduce channel heights, the entrances to the trailing edge cooling passage needs to be configured so that dirt and debris cannot enter.

SUMMARY

A airfoil suitable for use in a gas turbine engine according to an exemplary aspect of the present invention includes: an airfoil which defines an internal cavity along a cavity axis, the internal cavity in communication with a trailing edge passage through at least one feed passage. The at least one feed passage at least in part defined along a feed axis which is at least perpendicular to the cavity axis.

A method of reducing dirt ingestion into a trailing edge passage for a airfoil suitable for use in a gas turbine engine according to an exemplary aspect of the present invention includes: arranging at least one feed passage in communication with a trailing edge passage within an airfoil, the at least one feed passage at least partially defined along a feed axis, the feed axis at least perpendicular to a cavity axis defined by an internal cavity in communication with the at least one feed passage.

A method of manufacturing a trailing edge passage for a airfoil suitable for use in a gas turbine engine according to an exemplary aspect of the present invention includes: fabricating a refractory metal form to have a trailing edge passage section and at least one feed passage section. Arranging the refractory metal form such that the at least one feed passage section is in communication with an internal cavity within a airfoil. Removing the refractory metal form to fabricate a trailing edge passage with the trailing edge passage section and at least one feed passage with the at least one feed passage section, the internal cavity in communication with the trailing edge passage through the least one feed passage, the at least one feed passage at least in part defines a feed axis which is at least perpendicular to said cavity axis.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 1 is a general schematic partial fragmentary view of an exemplary gas turbine engine embodiment for use with the present invention;

DETAILED DESCRIPTION OF THE EXEMPLARY EMBODIMENTS

Figure 2A:
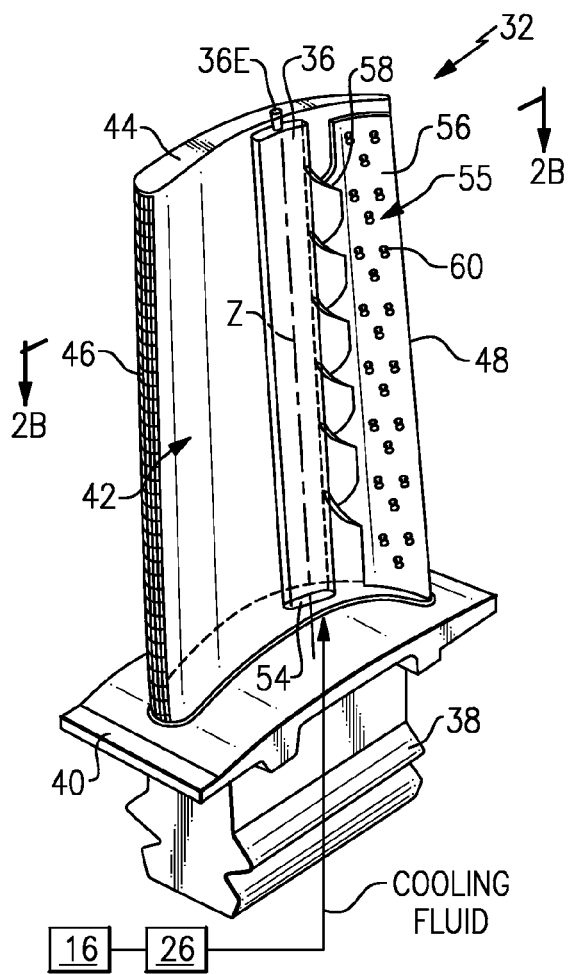
FIG. 2A is a perspective partial phantom view of a rotary airfoil incorporating the cooling system of the present invention.

FIG. 1 illustrates a general schematic view of a gas turbine engine 10 such as a gas turbine engine for power generation or propulsion. FIG. 1 is a highly schematic view, however, the main components of the gas turbine engine are illustrated. Further, while a particular type of gas turbine engine is illustrated, it should be understood that the claim scope extends to other types of gas turbine engines such as commercial and military engine designs.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Air compressed in the compressor 16, 26 is mixed with fuel, burned in the combustor 30, and expanded in turbines 18, 28. The air compressed in the compressors 16, 18 and the fuel mixture expanded in the turbines 18, 28 may be referred to as a hot gas stream along a core gas path. The turbines 18, 28 include rotor disks 22 which, in response to the expansion, drive the compressors 16, 26 and fan 14. The turbines 18, 28 include alternate rows of rotary airfoils or blades 32 and static airfoils or vanes 34. It should be understood that a multiple of rotor disks 22 may be contained within each engine section and that although a single blade from a single disk in the high pressure turbine section is illustrated and described in the disclosed embodiment, other sections which have other blades such as fan blades, low pressure turbine blades, high pressure turbine blades, high pressure compressor blades and low pressure compressor blades will also benefit herefrom.

Figure 2B:
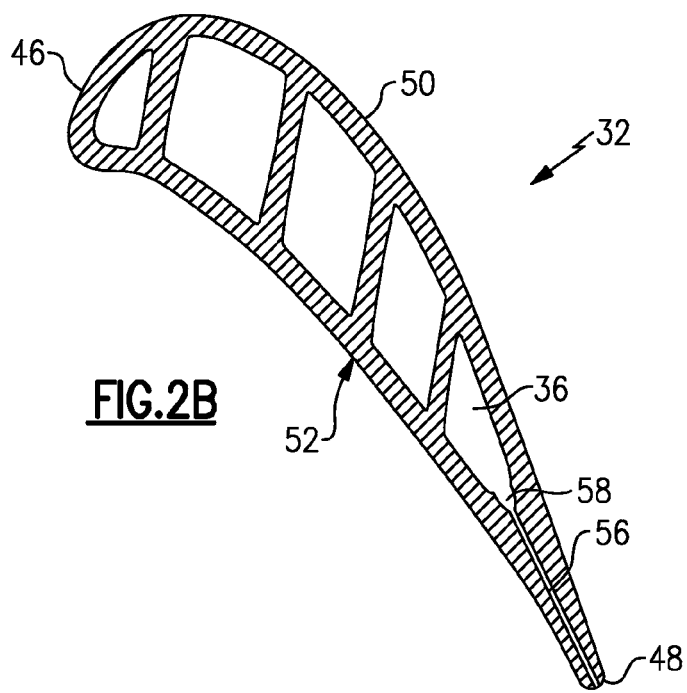
FIG. 2B is a sectional view taken along the line 2B-2B of the airfoil in FIG. 2A.
Figure 2C:
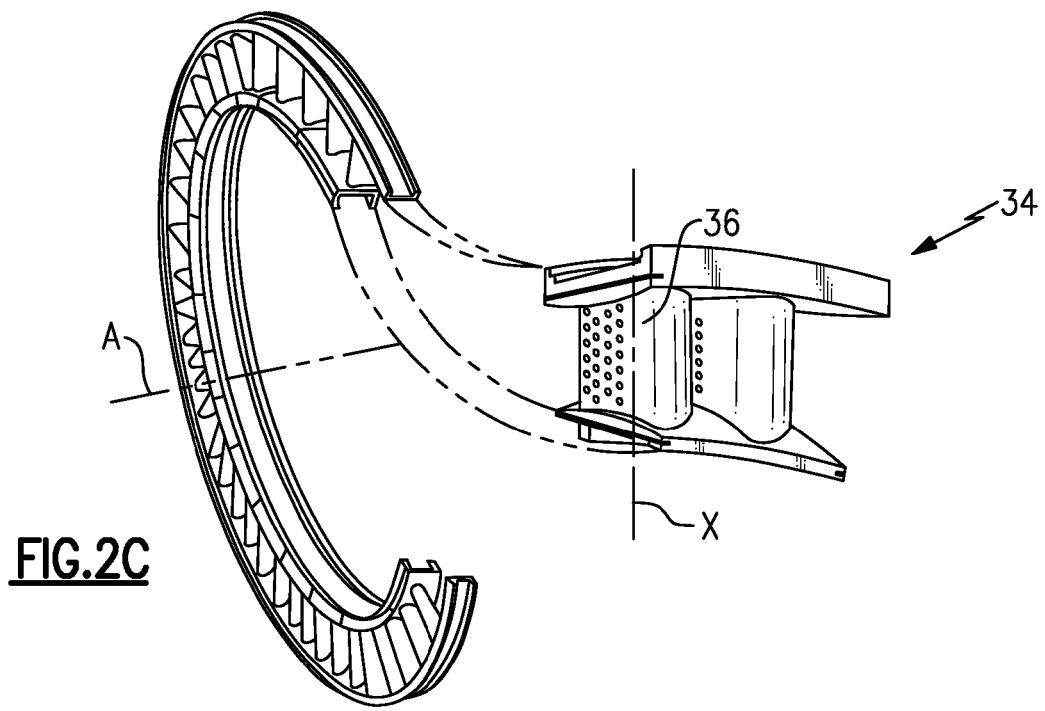
FIG. 2C is a perspective partial phantom view of a static airfoil incorporating the cooling system of the present invention.

Referring to FIG. 2A, one non-limiting embodiment of a high pressure turbine blade 32 with at least one internal cavity 36 (also illustrated in FIG. 2B) is illustrated in more detail. Other internal cavities or sections thereof may alternatively or additionally be incorporated into the blade 32 and arranged in various configurations. The internal cavity 36 may be of any conventional multi-pass serpentine channels with cooling fluid typically being sourced as bleed air from the compressors 16, 26. It should be understood that although the high pressure turbine blade 32 is illustrated in one non-limiting embodiment other airfoils such as a static airfoil or vanes 34 (FIG. 2C) may also include the internal cavity 36 as disclosed herein.

The blade 32 generally includes a root 38 that is secured to the rotor disk 22, a platform 40 supported by the root 38 and an airfoil portion 42, which extends from the platform 40 to a blade tip 44. Typically, the cooling fluid is supplied at the root 38. The blade 32 is further defined by a leading edge 46 and a trailing edge 48. Defined between the leading edge 46 and the trailing edge 48 is a suction side 50 provided by a convex surface and a pressure side 52 provided by a concave surface opposite of the suction side 50.

The cooling fluid flows through the internal cavity 36 to continuously remove thermal energy from the trailing edge 48 of the blade 32 through a trailing edge cooling system 55. The cooling fluid enters the internal cavity 36 through at least one inlet 54 in the root 38. The cooling fluid is then communicated from the internal cavity 36 to the trailing edge cooling system 55. The trailing edge cooling system 55 includes a trailing edge passage 56 and at least one feed passage 58 which provides cooling fluid communication from the internal cavity 36 to the trailing edge passage 56.

The trailing edge passage 56 may be a radial flow passage which is at least partially supported by a multiple of pedestals 60. The trailing edge passage 56 and pedestals 60 are manufactured to provide an extremely thin passage which is machined or otherwise molded within the blade 32. In one non-limiting embodiment, the trailing edge cooling system 55 is formed by a refractory metal form F (FIG. 3) which is encapsulated in a blade mold prior to casting as generally understood. Several refractory metals including molybdenum (Mo) and Tungsten (W) have melting points that are in excess of typical casting temperatures of nickel based superalloys typical of the blade 32. The refractory metal form F is produced as a thin sheet to manufacture the desired trailing edge cooling system 55. More specifically, such cooling passages may be fabricated into components including, but not limited to, combustor liners, turbine vanes, turbine blades, turbine shrouds, vane endwalls, airfoil edges and others.

Thin refractory metal sheets possess enough ductility to allow bending and forming into complex shapes. The ductility yields a robust design capable of surviving a waxing/shelling cycle of the blade manufacturing process. After casting, the refractory metal form F is readily removed, such as through chemical removal, thermal leeching, or oxidation methods, leaving behind a cavity such as the trailing edge passage 56 and the at least one feed passage 58 which form the trailing edge cooling system 55. It is noted that other sections of the cooling system, such as internal cavity 36, may alternatively or additionally be manufactured through investment casting techniques with ceramic cores.

Figure 3:
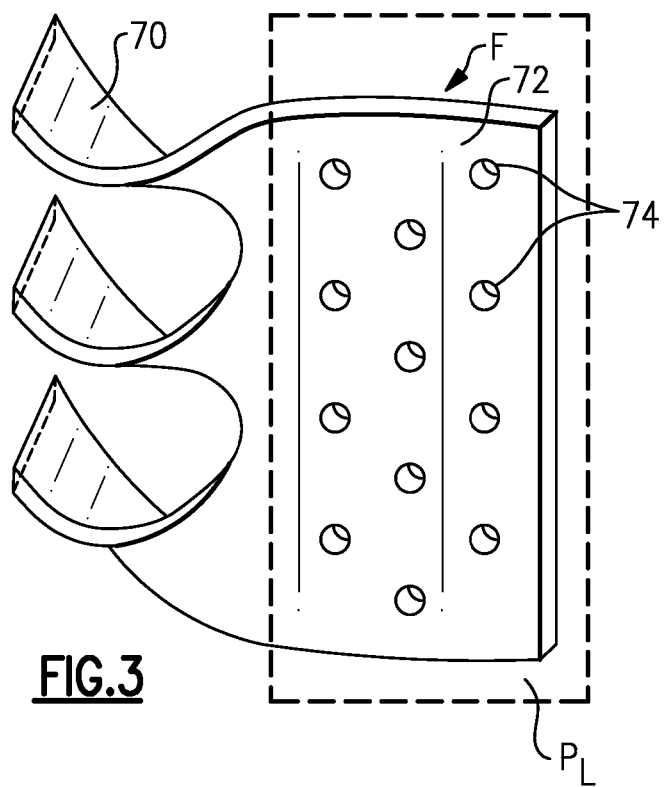
FIG. 3 is a perspective view of a refractory metal form to manufacture the cooling system of FIG. 2A.

Referring to FIG. 3, the refractory metal form F is fashioned such that at least one feed passage section 70 is essentially twisted out of a plane PL defined by a trailing edge passage section 72 which forms the trailing edge passage 56 (FIG. 2A). In one non-limiting embodiment, the feed passage section 70 of the refractory metal form F is arranged such that the at least one feed passage 58 (FIG. 2A) formed by the feed passage section 70 is aligned at least perpendicular to an axis Z defined by the internal cavity 36 (FIG. 2A). The refractory metal form F further includes apertures 74 which are formed through the trailing edge passage section 72. The apertures 74 produce the pedestals 60 in the trailing edge passage 56 (FIG. 2A) to provide a serpentine axial flow and support the trailing edge 48. It should be understood that various pedestals 60 and other support or flow directing structure may be formed in the trailing edge passage 56 by formation in the refractory metals form F.

Figure 4:
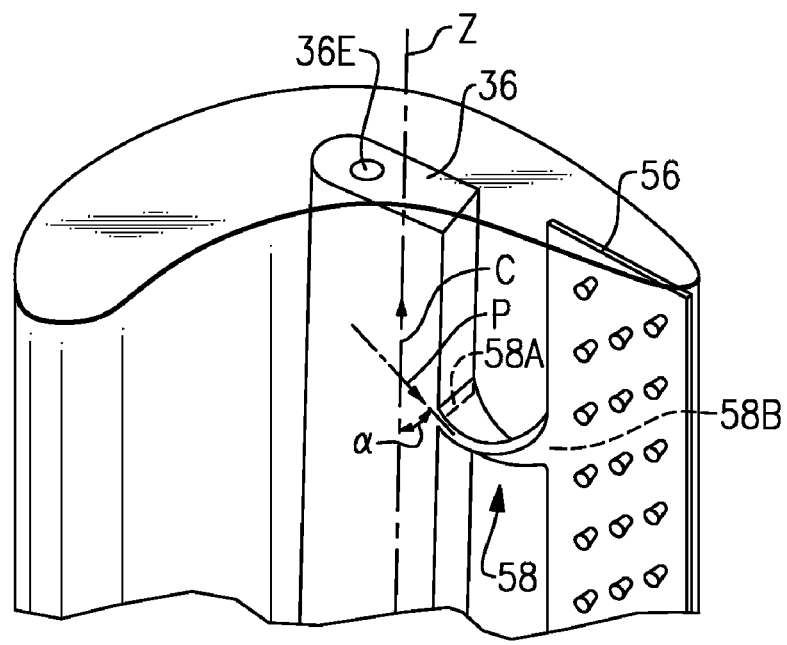
FIG. 4 is an expanded perspective partial phantom view of the cooling system of FIG. 2A.

Referring to FIG. 4, each entrance 58A to each feed passage 58 is arranged generally transverse to the trailing edge passage 56. The feed passage 58 also defines an angle $\alpha$ between the velocity vector C defined generally along the blade axis Z of the cooling fluid entering the internal cavity 36 and the velocity vector P into the at least one feed passage 58. The feed passage velocity vector P into the feed passage entrance 58A is perpendicular or less than perpendicular to the velocity vector C of the cooling fluid. In this non-limiting embodiment, each feed passage 58 is essentially a twisted three-dimensional shape in the refractory metal form F such that the feed passage entrance 58A formed thereby is transverse to a feed passage exit 58B which communicates with the trailing edge passage 56.

The at least one feed passage 58 prevents dirt and debris from entering the trailing edge passage 56 to thereby allow usage of a much thinner cooling passage without the risk of plugging. The thinner trailing edge passage 56 also allows the cooling fluid to have an exit Mach number optimized to assure cooling of the blade 32 with a reduced cooling fluid flow and a reduced trailing edge 48 thickness.

Dirt and debris particles are generally communicated with the cooling fluid flow but are typically much denser than the cooling fluid such that the particles do not readily follow the direction of the cooling fluid flow due to the relatively large amount of particle momentum. Additionally, the particles will be centrifuged outward within a rotating part such as the rotor blade 32 which rotates about the engine axis A.

Figure 5:
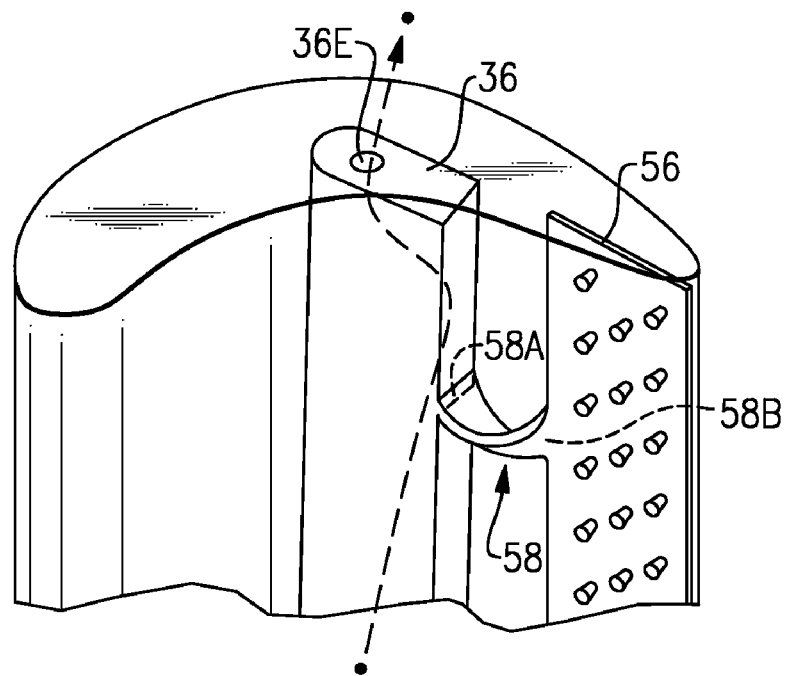
FIG. 5 is an expanded perspective partial phantom view of the cooling system illustrating an idealized path of a particle which avoids the cooling passage.

The orientation of the internal cavity 36 is thereby configured to impart and maintain a large amount of momentum to the particles while the at least one feed passage 58 is oriented such that the particle cannot overcome its momentum to make the turn into the feed passage 58 (FIG. 5). Trip strips may be avoided so as not to disrupt the momentum of the particles in the internal cavity 36, however, other heat transfer augmentation features such as dimples or fish scales may alternatively or additionally be utilized.

An exit 36E is located through the blade tip 44 of the rotor blade 32 to provide an exit for the debris (FIG. 5). The exit 36E in one non-limiting embodiment is a core printout located through the blade tip 44.

Figure 6:
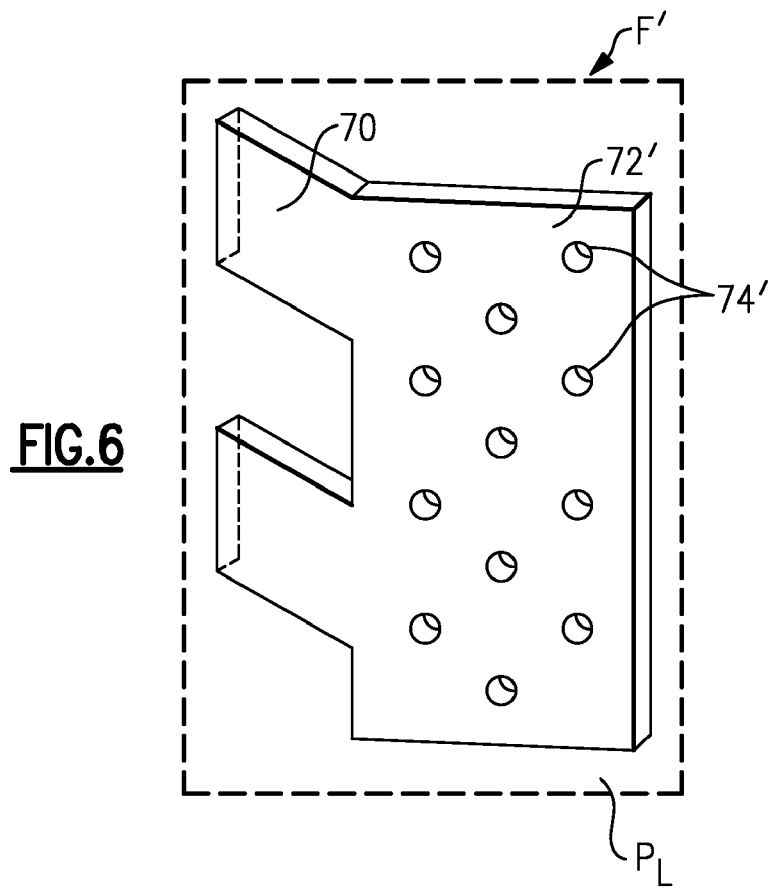
FIG. 6 is a perspective view of another refractory metal form to manufacture another cooling system.
Figure 7:
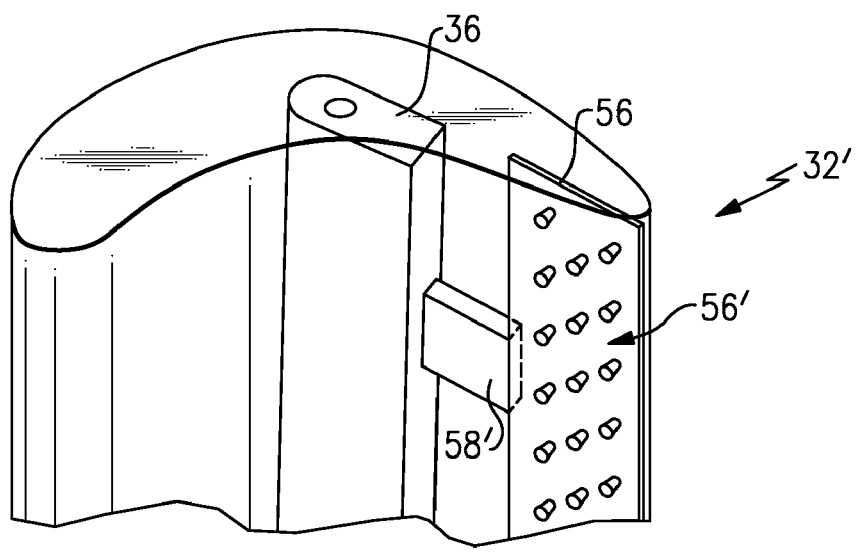
FIG. 7 is a perspective partial phantom view of an airfoil incorporating the cooling system with the refractory metal form of FIG. 6.

Referring to FIG. 6, another non-limiting embodiment of a refractory metal form F' includes at least one feed passage section 70' defined within the same plane PL as the trailing edge passage section 72 but raked to form an acute angle relative the velocity vector of the cooling fluid which transits the internal cavity 36. That is, each feed passage section 70' in the refractory metal form F" is not twisted but only angled or raked to fabricate a feed passage 58' (FIG. 4) to prevent debris from entering the trailing edge passage 56' of the blade 32'.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An airfoil suitable for use in a gas turbine engine comprising:
    an airfoil which defines an internal cavity along a cavity axis, said internal cavity in communication with a trailing edge passage through at least one feed passage, said at least one feed passage at least in part defined along a feed axis which is at least perpendicular to said cavity axis, wherein said feed axis defines an acute angle relative to said cavity axis; and
    wherein said at least one feed passage is raked in a direction opposite a particle direction generally within said internal cavity.

2. The airfoil as recited in claim 1, further comprising an exit from said internal cavity to eject said particle from said internal cavity.

3. The airfoil as recited in claim 1, wherein said cavity axis is defined generally along a length of the airfoil which extends radially from an engine axis.

4. The airfoil as recited in claim 1, wherein said airfoil is a rotary airfoil.

5. The airfoil as recited in claim 1, wherein said airfoil is a static airfoil.

6. The airfoil as recited in claim 1, where said at least one feed passage is twisted along an axis thereof.

7. The airfoil as recited in claim 1, wherein said at least one feed passage comprises a feed passage entrance defined along said feed axis, and wherein said at least one feed passage extends from said feed passage entrance in a direction generally toward a platform of said airfoil to define said acute angle.

8. The airfoil as recited in claim 7, wherein, at a point downstream of said feed passage entrance, said at least one feed passage extends toward said trailing edge passage in a direction generally toward a tip of said airfoil.

9. The airfoil as recited in claim 8, wherein said at least one feed passage extends from said feed passage entrance toward said trailing edge.

10. The airfoil as recited in claim 9, wherein said airfoil includes said platform, a tip opposite of said platform, an airfoil portion between said platform and said tip, and a root supporting said platform.

11. A method of reducing dirt ingestion into a trailing edge passage for an airfoil suitable for use in a gas turbine engine comprising:
    arranging at least one feed passage in communication with a trailing edge passage within an airfoil, the at least one feed passage at least partially defined along a feed axis, the feed axis at least perpendicular to a cavity axis defined by an internal cavity in communication with the at least one feed passage;
    arranging the feed axis at an acute angle relative to the cavity axis; and
    twisting the at least one feed passage between the internal cavity and the trailing edge passage.

12. A method as recited in claim 11, further comprising:
    arranging the at least one feed passage at an acute angle relative to the cavity axis.

13. A method as recited in claim 11, further comprising:
    arranging an entrance to the at least one feed passage transverse to the trailing edge passage.

14. A method as recited in claim 11, further comprising:
    at least partially supporting the trailing edge passage with a multiple of pedestals.

15. A method of manufacturing a trailing edge passage for an airfoil suitable for use in a gas turbine engine comprising:
    fabricating a refractory metal form to have a trailing edge passage section and at least one feed passage section;
    arranging the refractory metal form such that the at least one feed passage section is in communication with an internal cavity within a airfoil; and
    removing the refractory metal form to fabricate a trailing edge passage with the trailing edge passage section and at least one feed passage with the at least one feed passage section, the internal cavity in communication with the trailing edge passage through the least one feed passage, the at least one feed passage at least in part defines a feed axis which is at least perpendicular to said cavity axis, wherein said feed axis defines an acute angle relative to said cavity axis; and
    twisting the at least one feed passage section between the internal cavity and the trailing edge passage section.

16. The airfoil as recited in claim 15, wherein fabricating a refractory metal form further comprises:
    forming at least one aperture in the trailing edge passage section.

17. The method recited in claim 15, wherein said at least one feed passage comprises a feed passage entrance defined along said feed axis, and wherein said at least one feed passage extends from said feed passage entrance in a direction generally toward a platform of said airfoil to define said acute angle.

18. An airfoil suitable for use in a gas turbine engine comprising:
    an airfoil which defines an internal cavity along a cavity axis, said internal cavity in communication with a trailing edge passage through at least one feed passage, wherein said at least one feed passage is twisted between said internal cavity and said trailing edge passage, and wherein said feed axis defines an acute angle relative to said cavity axis.

19. The airfoil as recited in claim 18, wherein said at least one feed passage is twisted along an axis thereof.

20. The airfoil as recited in claim 18, wherein said at least one feed passage is twisted along a length thereof.

21. The airfoil as recited in claim 18, wherein said at least one feed passage comprises a feed passage entrance defined along said feed axis, and wherein said at least one feed passage extends from said feed passage entrance in a direction generally toward a platform of said airfoil to define said acute angle.

* * * * *